United States Patent [19]

Turner et al.

[11] Patent Number: 4,640,578
[45] Date of Patent: Feb. 3, 1987

[54] OPTICAL INSPECTION DEVICE FOR INSPECTING AN ARTICLE SURFACE

[75] Inventors: Charles F. R. Turner, Hingham; John V. Wingfield, Bishop's Stortford, both of England

[73] Assignee: Prior Scientific Instruments Limited, Hertfordshire, England

[21] Appl. No.: 713,880

[22] Filed: Mar. 20, 1985

[30] Foreign Application Priority Data

Mar. 20, 1985 [GB] United Kingdom ............... 8407197

[51] Int. Cl.⁴ .................. G02B 27/02; G02B 7/00
[52] U.S. Cl. ............................. 350/239; 279/1 L; 350/241; 350/257
[58] Field of Search ............... 350/238–241, 350/243–244, 251–252, 257, 529–533; 356/30, 73.1; 269/900, 55; 51/216 LP, 217 L; 279/1 A, 1 B, 1 L, 24

[56] References Cited

U.S. PATENT DOCUMENTS

| D. 244,279 | 5/1977 | Ponemon | 279/1 A |
| 3,438,690 | 4/1969 | Skerman | 350/529 |
| 3,608,915 | 9/1971 | Hohwart | 279/1 L |
| 3,740,121 | 6/1973 | Everett | 350/247 |
| 4,047,806 | 9/1977 | Puel | 350/241 |
| 4,066,330 | 1/1978 | Jones | 350/257 |
| 4,341,045 | 7/1982 | Sorrells | 51/216 LP |
| 4,505,556 | 3/1985 | Bridson et al. | 350/532 |

FOREIGN PATENT DOCUMENTS

| 852162 | 10/1952 | Fed. Rep. of Germany | 279/1 L |
| 630268 | 11/1927 | France | 350/529 |
| 2523492 | 9/1983 | France | 269/900 |
| 2110127 | 6/1983 | United Kingdom | 279/1 L |
| 2118522 | 11/1983 | United Kingdom | 279/1 L |
| 662849 | 5/1979 | U.S.S.R. | 356/73.1 |

Primary Examiner—William H. Punter
Attorney, Agent, or Firm—Charles E. Brown; Charles A. Brown

[57] ABSTRACT

A hand-held optical inspection device for checking, for example, the accuracy of the end surfaces of a fibre optic cable to be joined together. A body portion of the device is arranged to accept any of a range of adapter components capable of engaging in a variety of cable connector terminals. The cable and the adapter component are then snap-fitted into a centering ring of the inspection device with the end surface of the cable in the focussing plane of the lenses of the device. The surface may be inspected and may be moved laterally in the focussing plane by an eccentric cam arrangement operating on the centering ring.

3 Claims, 7 Drawing Figures

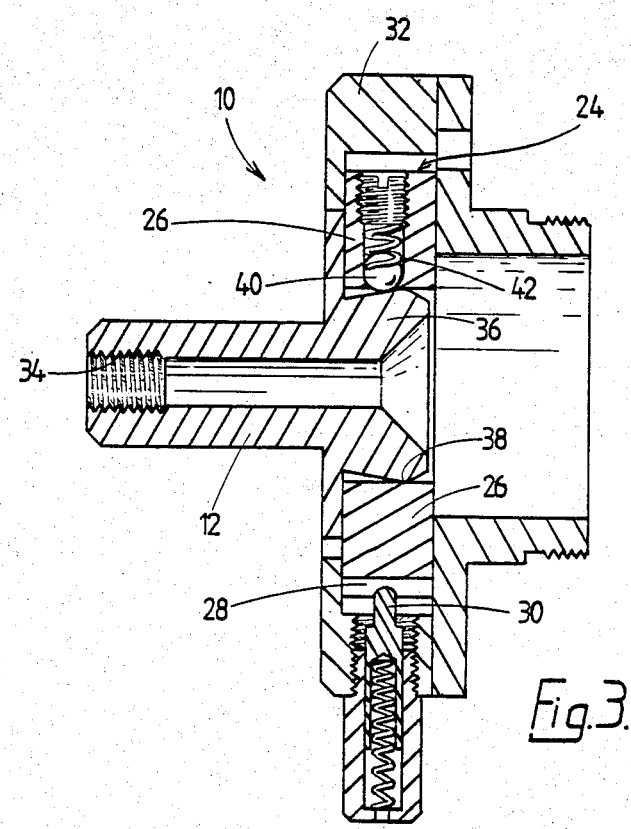
Fig.3.
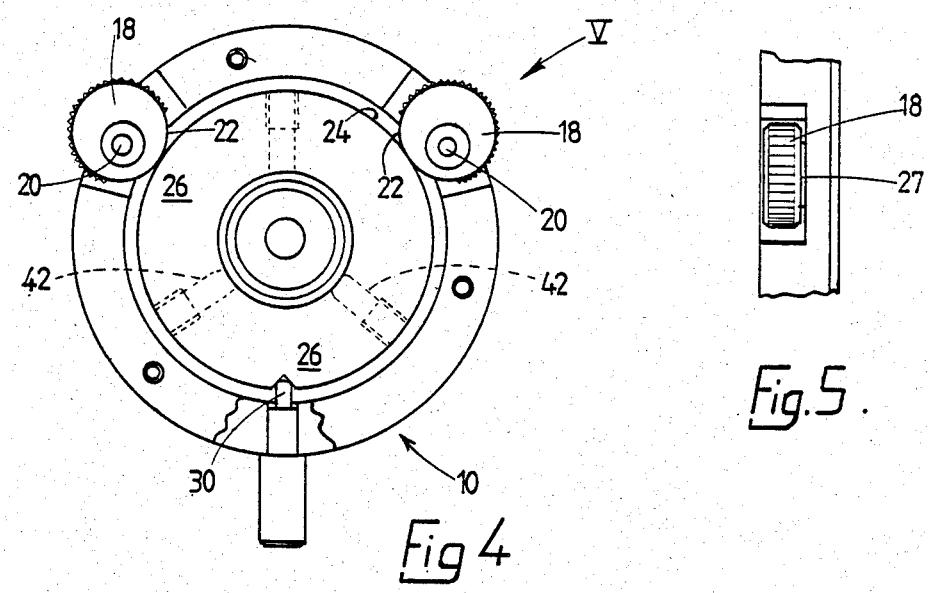
Fig 4.
Fig.5.

OPTICAL INSPECTION DEVICE FOR INSPECTING AN ARTICLE SURFACE

BACKGROUND OF THE INVENTION

The invention is concerned with improvements in or relating to optical inspection devices, particularly hand-held devices suitable for use in surface inspection and involving magnification means.

In manufacturing or assembly processes it is for example frequently necessary to inspect machined or otherwise worked surfaces during quality control checks. in specialised fields, the accurate assembly of parts may adversely affected by surface irregularities and this is especially disadvantageous for example where the parts to be connected are optical fibre cables. There is thus a requirement for an inspection device which permits a visual check of a surface area for the presence of inaccuracies in its formation.

BRIEF DESCRIPTION OF THE INVENTION

The invention therefore provides a hand-held optical inspection device comprising a magnifying lens arrangement received within a casing, viewing means disposed at one end of the casing, and, at the opposite end thereof, adapter means capable of receiving in an adjustable manner a portion of an article upon which is the surface to be viewed, wherein the adapter means is capable of imparting controlled lateral movement of the surface with respect to the longitudinal axis of the lens arrangement in the focussing plane thereof.

Advantageously, the adapter means may comprise an interchangeable component which is selected from a series of components, each capable of receiving one of a range of types of surface areas to be viewed and arranged to present the surface for viewing in at least substantially the correct position with respect to the focussing plane of the lens arrangement.

In certain circumstances, it may be desirable, in order to reveal more detail of the surface to be viewed, to tilt it at an angle with respect to the longitudinal axis of the lens arrangement. An interchangeable component of the adapter means may therefore be selected which is capable of a swivelling movement and may conveniently incorporate a spherical joint.

In an example to be described below the device is for use in the inspection of optical fibre terminations where the end surfaces to be joined must be as accurately formed as possible to minimise light losses at junctions. Thus a series of adapter components may be provided, each capable of receiving one of a variety of proprietary connector pieces attached to cut ends of optical fibre cables. In use, the selection of the appropriate adapter component will result in the cut end surface of the cable being presented to the device in the focussing plane of the lens system thereof, lateral movement being achieved by adjustment means which may, for example, be screw- or cam-operated.

For ease of use, the casing of the device may incorporate a pistol-grip including a switch arrangement if required for operation of illumination means also received within the casing. Where illumination is required, the lens arrangement may include a beam splitter.

BRIEF DESCRIPTION OF DRAWINGS

There will now be described two examples of devices according to the invention. It will be understood that the description which is to be read with reference to the drawings, is given by way of example only, and not by way of limitation.

In the drawings:

FIG. 3 is cross-sectional view through an adapter arrangement of the first device;

FIG. 4 is an end view of the arrangement of FIG. 3, with an end plate and an adapter component removed for clarity;

FIG. 5 is a fragmentary view in the direction of arrow V of FIG. 4;

DETAILED DESCRIPTION OF DRAWINGS

Figure 6:
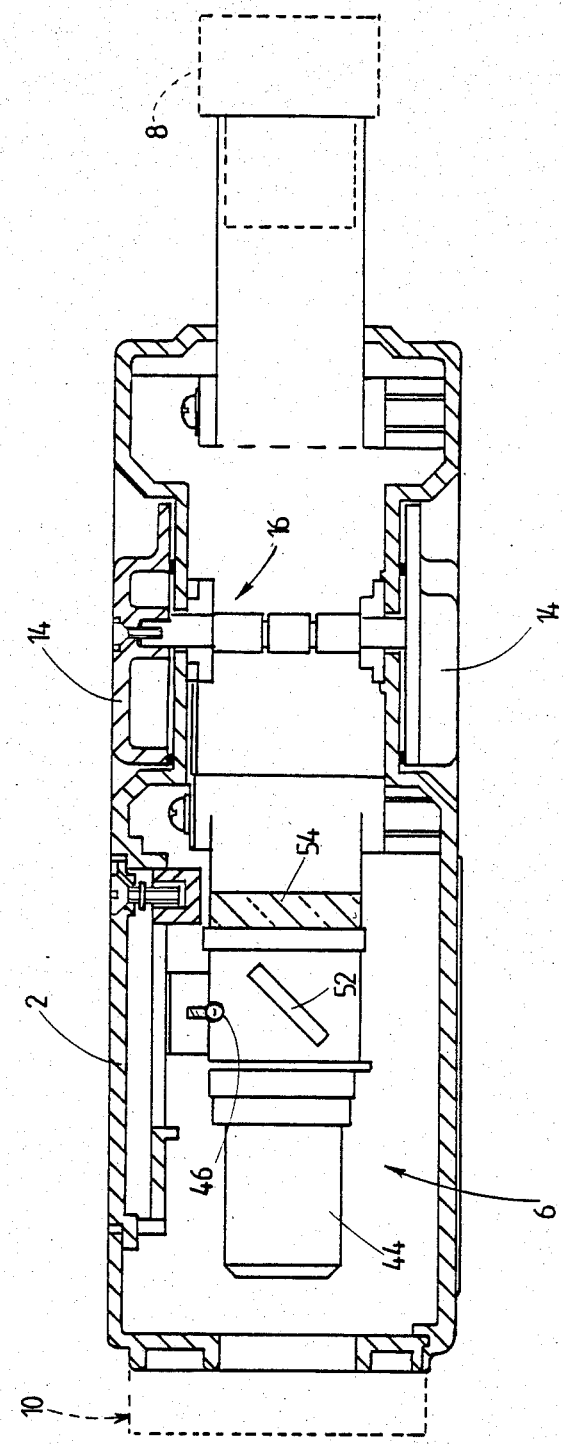
FIG. 6 is a sectional view on line VI—VI of FIG. 1.

The device to be described comprises a casing 2 incorporating a handle 4 in the form of a pistol grip. The main body portion of the casing 2 houses a lens arrangement indicated at 6 (FIG. 6) which is described in detail below. An adjustable eye-piece 8 is received at one end of the casing and it will be understood that a suitable eye piece may be interchangeably selected from a range. A graticule may be incorporated in the eye piece, if desired.

Figure 2:
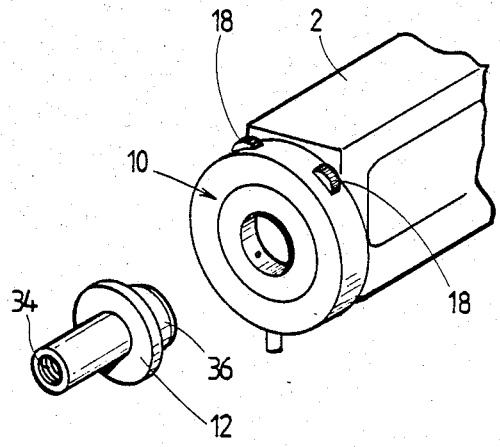
FIG. 2 is a fragmentary perspective view of an end portion thereof.

At the opposite end of the casing 2 is an adapter means 10, which is shown in perspective in FIG. 2 together with a hollow adapter component 12. This component 12 is intended to receive a proprietary connector (not shown) secured to the end face of an optical fibre cable. The arrangement is such that on fitting the connector into an appropriate adapter component 12 selected from a range of adapters, the end surface of the cable is positioned within the field of focus of the lens arrangement 6. The lens arrangement 6 may be manually focussed by means of knobs 14 through a rack and pinion mechanism 16 (FIG. 6), and the cable end viewed through the eyepiece 8. Lateral movement of the cable end is obtained by adjustment of two cam members 18 having knurled portions projecting from the adapter means 10 for engagement with the operator's finger tips.

As shown in FIGS. 3 and 4, the cam members 18 are eccentrically mounted on pins 20, cam surfaces 22 bearing on the circumferential edge surface 24 of a centring ring 26. The cam members are mounted to resist inadvertent rotating movement by the presence of wavy washers 27 (FIG. 5). An axial groove 28 in the surface 24 is engaged by a spring-biassed reaction pin 30 to co-operate with the camming action. The ring 26 is held in place by an annular front cap 32.

The adaptor component 12 (FIG. 3) comprises an internally threaded portion 34 at its outer end to receive the appropriate proprietary connector and at its inner end has an enlarged head portion 36 having a peripheral ridge 38 receivable within the aperture of the ring 26 and retained therewithin by means of three spring-biassed balls 40 received in bores 42. Thus, in the event of the device being, for example, accidentally knocked or dropped, the adaptor 12 will instantly release to minimise the risk of damage to the cable or to any apparatus that may be connected to it.

Figure 7:
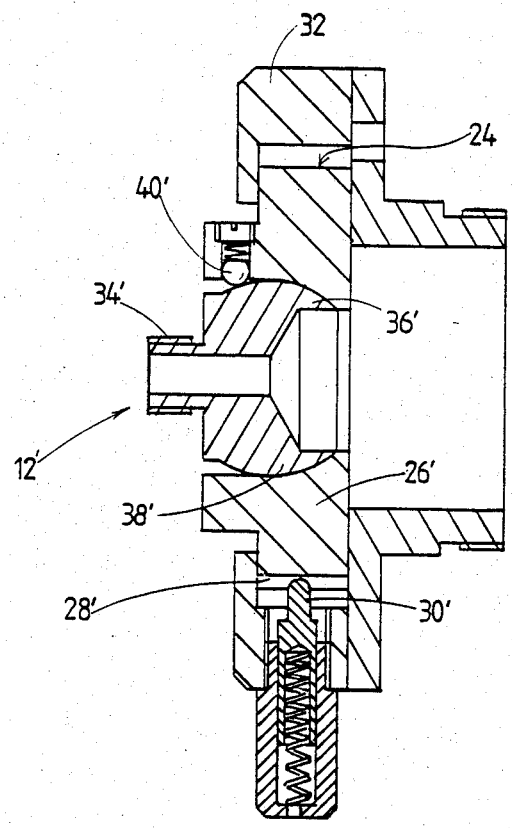
FIG. 7 is a cross-sectional view similar to FIG. 3 of an alternative form of adapter arrangement of a second device.

In FIG. 7 is illustrated an alternative adapter component 12' comprising an external threaded portion 34' at its outer end to receive an alternative proprietary connector. The adapter 12' is provided at its inner end with an enlarged part-spherical head portion 36' received within the aperture of a ring 26' and retained therein, as was the case in FIG. 3, by means of three spring-biassed balls 40'. The adapter component 12' is thus capable of movement to position the end surface of the fibre at an oblique angle with respect to the longitudinal axis. In the present example, the adapter is capable of movement up to 20° from the said axis.

Figure 1:
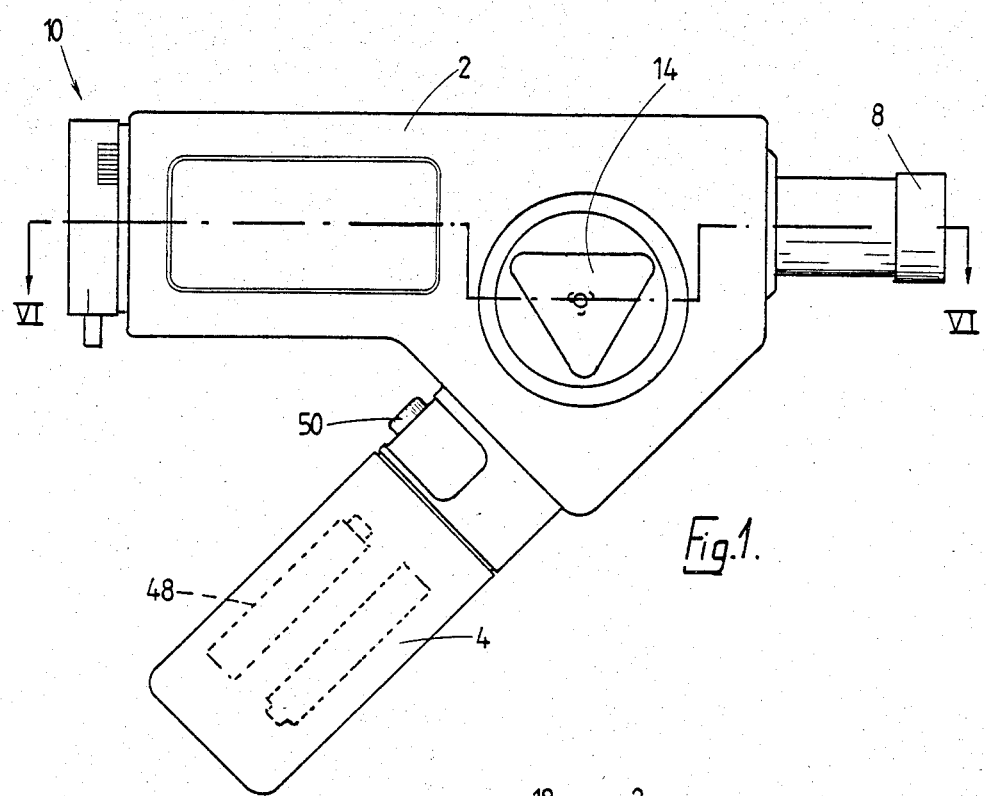
FIG. 1 is a side view of the first device to be described.

The lens arrangement 6 will now be described and comprises, in the present example, an achromatic X10 objective 44 or alternatively an X20 objective. Illumination is provided by a 2.8 watt halogen bulb 46 powered by two batteries 48 in the pistol-grip handle 4 and controlled by a switch 50 (FIG. 1). A dichroic beam splitter 52 directs light onto the cable end so that the latter is viewable through the eyepiece 8. Where the cable may still be secured at its opposite to an apparatus using laser light, a safety precaution is the provision of a laser light filter 54.

We claim:

1. A hand-held optical inspection device comprising a magnifying lens arrangement, a casing enclosing said lens arrangement, said casing having two end regions, viewing means disposed at one of said end regions of the casing, and, at the opposite end region, adapter means capable of receiving in an adjustable manner a portion of an article upon which is the surface to be viewed, wherein the adapter means is capable of imparting controlled lateral movement of the surface with respect to the longitudinal axis of the lens arrangement in the focussing plane thereof, said adapter means including a centering ring in which an adapter component is received, and wherein the arrangement for imparting said controlled lateral movement comprises at least two cam surfaces arranged to impart pressure in a generally radially inward direction on spaced-apart regions of the perimeter of the ring, and spring-biassed reaction means for supporting the ring in the device.

2. A device as claimed in claim 1 wherein said lens arrangement has a focussing plane, and the adapter means includes means mounting said adapter component for swivelling movement with respect to the focussing plane of the lens arrangement.

3. A device as claimed in claim 1 wherein said lens arrangement has a focussing plane, the adapter means includes a mounting arrangement mounting said adapter component for swivelling movement in said centering ring with respect to the focussing plane of the lens arrangement, and wherein the mounting arrangement of the adapter component in said centering ring includes a spherical-joint.

* * * * *